United States Patent
Huang et al.

(10) Patent No.: US 11,277,319 B2
(45) Date of Patent: Mar. 15, 2022

(54) DIAGNOSING NETWORK

(71) Applicant: New H3C Technologies Co., Ltd., Zhejiang (CN)

(72) Inventors: Xiang Huang, Beijing (CN); Haitao Zhang, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 0 days.

(21) Appl. No.: 17/040,608

(22) PCT Filed: Mar. 28, 2019

(86) PCT No.: PCT/CN2019/080009
§ 371 (c)(1),
(2) Date: Sep. 23, 2020

(87) PCT Pub. No.: WO2019/184965
PCT Pub. Date: Oct. 3, 2019

(65) Prior Publication Data
US 2021/0044500 A1   Feb. 11, 2021

(30) Foreign Application Priority Data
Mar. 30, 2018 (CN) .......................... 201810291516.4

(51) Int. Cl.
*H04L 12/24* (2006.01)
*H04L 29/12* (2006.01)
(Continued)

(52) U.S. Cl.
CPC ...... *H04L 41/5038* (2013.01); *H04L 61/1511* (2013.01); *H04W 12/06* (2013.01); *H04W 24/06* (2013.01); *H04W 84/12* (2013.01)

(58) Field of Classification Search
USPC ........................................................ 709/223
See application file for complete search history.

(56) References Cited

U.S. PATENT DOCUMENTS 8,238,834 B1 * 8/2012 Bharghavan .......... H04W 24/06
455/67.11
9,549,333 B2 1/2017 Arda et al.
(Continued)

FOREIGN PATENT DOCUMENTS

CN   101448277 A   6/2009
CN   101938764 A   1/2011
(Continued)

OTHER PUBLICATIONS

State Intellectual Property Office of the People's Republic of China, Office Action and Search Report Issued in Application No. 2018102915164, dated Mar. 2, 2020, 35 pages, (Submitted with Machine Translation).
(Continued)

*Primary Examiner* — Hermon Asres
(74) *Attorney, Agent, or Firm* — Greenblum & Bernstein, P.L.C.

(57) ABSTRACT

A method and an apparatus for diagnosing a network and a machine readable storage medium thereof are provided. As an example, the method of diagnosing a network comprises: a first AP running in a WLAN Doctor mode tests WLAN service quality provided by a second AP located in a diagnosis region of the first AP by simulating a client.

15 Claims, 4 Drawing Sheets

```
                                                    ┌─ 101
┌─────────────────────────────────────────────────────────────────┐
│ The first AP running in the WLAN Doctor mode obtains working    │
│ channel information of a second AP located in a diagnosis       │
│ region of the first AP, where a WLAN service provision mode in  │
│ which the second AP runs is different from the WLAN Doctor mode.│
└─────────────────────────────────────────────────────────────────┘
                              │
                              ▼                     ┌─ 102
┌─────────────────────────────────────────────────────────────────┐
│ The first AP tests the WLAN service quality provided by the     │
│ second AP by simulating a client based on the working channel   │
│ information of the second AP.                                   │
└─────────────────────────────────────────────────────────────────┘
```

(51) Int. Cl.
*H04W 12/06* (2021.01)
*H04W 24/06* (2009.01)
*H04W 84/12* (2009.01)
*H04L 43/55* (2022.01)
*H04L 61/4511* (2022.01)

(56) References Cited

U.S. PATENT DOCUMENTS

| | | | |
|---|---|---|---|
| 9,699,669 B2 | 7/2017 | Chou | |
| 2008/0253314 A1* | 10/2008 | Stephenson | H04B 17/26 370/326 |
| 2010/0246416 A1 | 9/2010 | Sinha et al. | |
| 2011/0228665 A1* | 9/2011 | Kumar | H04L 12/2825 370/216 |
| 2012/0184223 A1 | 7/2012 | Hakemeyer et al. | |
| 2013/0322262 A1 | 12/2013 | Akman et al. | |
| 2014/0003261 A1 | 1/2014 | Gillett et al. | |
| 2015/0126129 A1 | 5/2015 | Rangappagowda et al. | |
| 2017/0244777 A1 | 8/2017 | Ouyang et al. | |
| 2017/0366983 A1* | 12/2017 | Gunasekara | H04W 24/08 |
| 2018/0091382 A1 | 3/2018 | Dronadula | |

FOREIGN PATENT DOCUMENTS

| | | |
|---|---|---|
| CN | 102550071 A | 7/2012 |
| CN | 102891877 A | 1/2013 |
| CN | 102905296 A | 1/2013 |
| CN | 102905299 A | 1/2013 |
| CN | 103179599 A | 6/2013 |
| CN | 103200087 A | 7/2013 |
| CN | 103338475 A | 10/2013 |
| CN | 104158597 A | 11/2014 |
| CN | 104378451 A | 2/2015 |
| CN | 104640125 A | 5/2015 |
| CN | 104853373 A | 8/2015 |
| CN | 105024872 A | 11/2015 |
| CN | 105376754 A | 3/2016 |
| CN | 105703985 A | 6/2016 |
| CN | 106961693 A | 7/2017 |
| CN | 106993302 A | 7/2017 |
| CN | 107182054 A | 9/2017 |
| WO | 2011033076 A1 | 3/2011 |

OTHER PUBLICATIONS

State Intellectual Property Office of the People's Republic of China, Office Action and Search Report Issued in Application No. 2018102915164, dated Jul. 29, 2020, 32 pages, (Submitted with Machine Translation).
ISA State Intellectual Property Office of the People's Republic of China, International Search Report Issued in Application No. PCT/CN2019/080009, dated Jun. 14, 2019, WIPO, 4 pages.
State Intellectual Property Office of the People's Republic of China, Office Action and Search Report Issued in Application No. 2018102915164, dated Nov. 6, 2020, 28 pages, (Submitted with Machine Translation).
ISA State Intellectual Property Office of the People's Republic of China, Written Opinion of the International Searching Authority Issued in Application No. PCT/CN2019/080009, dated Jun. 14, 2019, WIPO, 9 pages.
European Patent Office, Extended European Search Report Issued in Application No. 19775127.4, dated Jul. 27, 2021, Germany, 10 pages.
Japanese Patent Office, Office Action Issued in Application No. 2020-552272, dated Nov. 2, 2021, 6 pages. (Submitted with Machine Translation).

* cited by examiner

DIAGNOSING NETWORK

CROSS-REFERENCE TO RELATED APPLICATIONS

The present application is a National Stage of International Application No. PCT/CN2019/080009, filed on Mar. 28, 2019, which claims priority to Chinese patent application No. 2018102915164, entitled "METHOD AND APPARATUS FOR DIAGNOSING A NETWORK, AND MACHINE READABLE STORAGE MEDIUM THEREOF" and filed on Mar. 30, 2018, the disclosure of each of which is incorporated herein by reference in its entirety.

TECHNICAL FIELD

The present disclosure relates to the field of network communication technology, and in particular, to a method and an apparatus for diagnosing a network and a machine readable storage medium thereof.

BACKGROUND

A Wireless Local Area Network (WLAN) is a network established in a particular region by using a wireless communication technology, which provides the function of a conventional wired Local Area Network (LAN) with a wireless channel as a transmission medium.

The WLAN features high susceptibility to environment and therefore is a dynamic network that changes in real time. If it is desired to maintain a high quality WLAN continuously, network administrators are usually required to perform uninterrupted diagnosis on the WLAN.

However, due to costs, many fixed locations such as hotels usually do not have on-site network administrators. Therefore, how to diagnose a network without network administrators now becomes a technical problem to be solved.

BRIEF DESCRIPTION OF THE DRAWINGS

The accompanying drawings which are incorporated in the description and constitute a part of the description illustrate examples consistent with the present disclosure and serve to explain the principles of the present disclosure together with the description.

DETAILED DESCRIPTION OF THE EMBODIMENTS

To make the object, technical solution and advantages of the present disclosure clearer, the present disclosure will be described below in detail in combination with accompanying drawings and specific examples.

Figure 1:
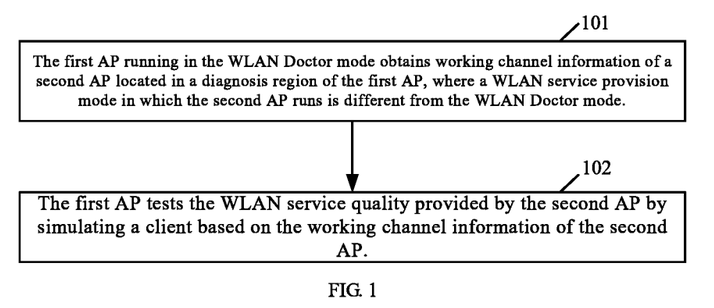
FIG. 1 is a flowchart illustrating an example of the present disclosure.

FIG. 1 is a flowchart illustrating an example of the present disclosure. The method may be applied to a first Access Point (AP) running in a WLAN Doctor mode. Here, the first AP is named only for distinguishing from a subsequent AP and is not intended to limit a particular AP.

As shown in FIG. 1, when the first AP runs in the WLAN Doctor mode, the flowchart may include the following blocks.

At block 101, the first AP running in the WLAN Doctor mode obtains working channel information of a second AP located in a diagnosis region of the first AP, where a WLAN service mode in which the second AP runs is different from the WLAN Doctor mode.

Here, the second AP is named only for convenience of description and is not intended to limit a particular AP.

In an example of the present disclosure, the diagnosis region of the first AP is a region that can be monitored by the first AP. For example, in the network structure shown in FIG. 2, if the first AP is an AP200 set in a corridor, a region that can be monitored by the AP200 located in the corridor is a region from guest room 21 to guest room 24. Thus, the diagnosis region of the first AP is the region from guest room 21 to guest room 24.

In an example, at block 101, the first AP may obtain the working channel information of the second AP located in the diagnosis region of the first AP according to a local configuration.

In another example, at block 101, the first AP may obtain the working channel information of the second AP located in the diagnosis region of the first AP according to a network diagnosis instruction from a network management device, specifically including: receiving the network diagnosis instruction and obtaining the working channel information of the second AP located in the diagnosis region of the first AP based on the network diagnosis instruction. The network management device herein may be a cloud management platform, or a local network device such as a server.

Figure 2:
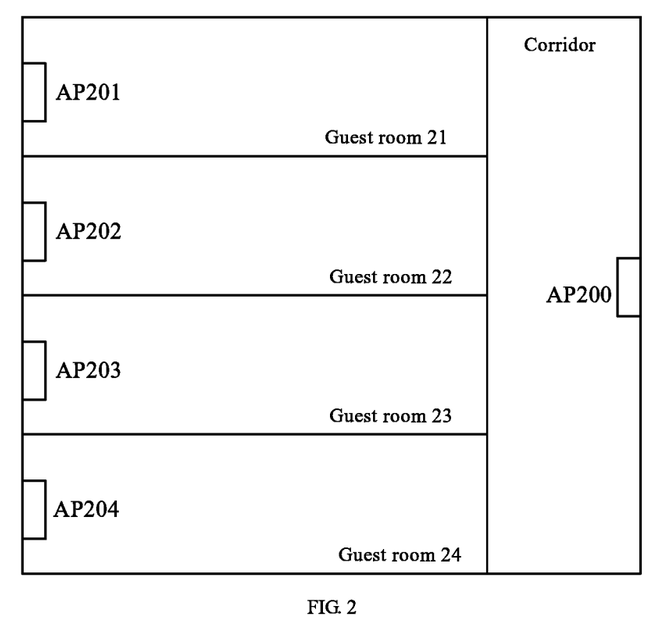
FIG. 2 is a schematic diagram illustrating application networking according to an example of the present disclosure.

In an example, the network diagnosis instruction herein is sent by the network management device when the network management device obtains that an WLAN service provided by the second AP is abnormal, and is dedicated to diagnosing the WLAN service provided by the second AP. For example, as shown in FIG. 2, when WLAN in the guest room 21 is abnormal, a hotel network administrator may report an external instruction indicating that the WLAN service in the guest room 21 is abnormal to the network management device through a mobile terminal after receiving a complaint from a guest of the guest room 21. Thus, the network management device may send a network diagnosis instruction to the AP200 (located in a corridor and equivalent to the first AP) of being capable of running in the WLAN Doctor mode and monitoring the guest room 21 after receiving the external instruction, so that the AP200 (equivalent to the first AP) is caused to be dedicated to diagnosing the WLAN service provided by the AP201 (equivalent to the second AP) in the guest room 21.

At block 102, the first AP tests the WLAN service quality provided by the second AP by simulating a client based on the working channel information of the second AP.

It can be seen from block 102 that, in the present disclosure, the first AP tests the WLAN service quality provided by the second AP located in the diagnosis region of the first AP by simulating the client, so that WLAN can be diagnosed in real time without participation of network administrators. In this way, human costs can be reduced.

Further, the speed of processing the network abnormality can be increased, thereby improving recovery efficiency of network access.

Thus, the flow of FIG. 1 is completed.

In an example, as shown in the flowchart of FIG. 1, the first AP may be at least one AP which is deployed at a designated position according to actual demand to perform the WLAN Doctor. Herein, the first AP that is deployed according to actual demand to perform WLAN Doctor can run in the WLAN Doctor mode once being powered on.

In another example, as shown in the flowchart of FIG. 1, the first AP may be at least one AP running in the WLAN service mode. On this precondition, the first AP may firstly perform mode switching, that is, switch from the running WLAN service mode to the WLAN Doctor mode, before performing the above flowchart of the FIG. 1.

In an example, the first AP switches from the running WLAN service mode to the WLAN Doctor mode based on a received mode switching instruction. The mode switching instruction may come from the network management device.

In the flowchart of FIG. 1, there are many implementations for block 102. The flowchart of FIG. 3 illustrates one implementation below.

Figure 3:
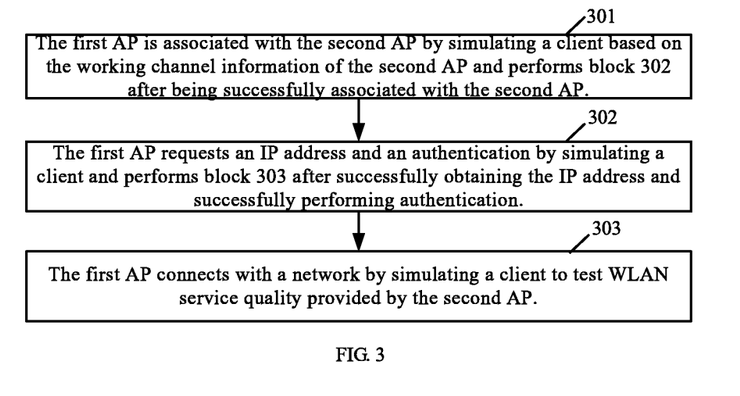
FIG. 3 is a flowchart illustrating an implementation of block 102 according to an example of the present disclosure.

FIG. 3 is a flowchart illustrating an implementation of block 102 according to an example of the present disclosure. As shown in FIG. 3, the flowchart may include the following blocks.

At block 301, the first AP is associated with the second AP by simulating a client based on the working channel information of the second AP, and performs block 302 after being successfully associated with the second AP.

In an example, the first AP switches to the working channel of the second AP by simulating the client so that the first AP is associated with the second AP. The specific association manner is similar to an existing manner of associating a client with an AP, which will not be described herein.

It is noted that, in the present disclosure, to guarantee that the network management device can fully obtain the entire process in which the first AP attempts to be associated with the second AP by simulating a client, the first AP, in an example, may further need to report association process information that the first AP is associated with the second AP by simulating a client and an association result to the network management device.

In an example, the association process information refers to process information that the first AP is associated with the second AP by simulating a client. For example, if the block of associating the first AP with the second AP by simulating a client mainly include sending an association probe request to the second AP by the first AP by simulating a client and receiving an association probe response returned by the second AP, the association process information may include information that whether the association probe request is sent successfully and information that whether the association probe response is received successfully.

In an example, the association result includes information that whether association is successful. If the first AP is successfully associated with the second AP by simulating a client, the association result includes successful association information and otherwise the association result includes unsuccessful association information.

Herein, by reporting the association process information that the first AP is associated with the second AP by simulating a client and the association result to the network management device, it can be guaranteed that the network management device fully monitors the entire process that the first AP is associated with the second AP by simulating a client and diagnoses out an abnormality in time when the abnormality occurs. Descriptions will be made below on how the abnormality is diagnosed out in time when the abnormality occurs with an example. Taking the abnormality as failure to send an association probe request for example, when the network management device receives information reported by the first AP in which an association probe request is unsuccessfully sent, an upstream egress flow bandwidth of the second AP is detected. If it is detected that the upstream egress flow bandwidth is far less than a desired bandwidth threshold, it is analyzed that the reason of unsuccessfully sending the association probe request is insufficient network bandwidth.

At block 302, the first AP requests an IP (Internet Protocol) address and an authentication by simulating a client, and performs block 303 after successfully obtaining the IP address and successfully performing authentication.

In the present disclosure, there is no fixed time sequence for the first AP to request the IP address and the authentication by simulating a client. The first AP may firstly request the IP address and then the authentication by simulating a client and may also firstly request the authentication and then the IP address, which is not limited herein.

Herein, a manner in which the first AP requests an IP address by simulating a client is similar to a manner in which an existing client requests an IP address, which are not described herein again.

It is noted that in the present disclosure, to guarantee that the network management device fully gets the entire process that the first AP requests the IP address by simulating a client, the first AP, in an example, may further need to report IP address request process information of requesting the IP address by simulating a client and an IP address request result to the network management device.

In an example, the IP address request process information refers to process information that the first AP requests the IP address. For example, a process that the first AP requests the IP address by simulating a client mainly includes: the first AP sends a Dynamic Host Configuration Protocol (DHCP) Discover packet to a DHCP server by simulating a client, the first AP receives a DHCP Offer packet returned by the DHCP server, the first AP sends a DHCP Request packet to the DHCP server, and the first AP receives a DHCP Acknowledgement (ACK) packet returned by the DHCP server; in this case, the IP address request process information includes that: whether the DHCP Discover packet is successfully sent, whether the DHCP Offer packet returned by the DHCP server is successfully received, whether the DHCP Request packet is successfully sent and whether the DHCP ACK packet returned by the DHCP server is successfully received.

In an example, the IP address request result includes information about whether the IP address is successfully obtained. If the first AP successfully obtains the IP address by simulating a client, the IP address request result includes information that the IP address is successfully obtained and otherwise, the IP address request result includes information that the IP address is unsuccessfully obtained. In an example, when the IP address request result includes information that the IP address is unsuccessfully obtained, if the first AP obtains a failure reason, the IP address request result may further include the failure reason.

Herein, by reporting the IP address request process information that the first AP requests the IP address and the IP address request result to the network management device by simulating a client, it can be guaranteed that the network management device fully monitors the entire process that the first AP requests the IP address by simulating a client and diagnoses out an abnormality reason in time when the abnormality occurs. Descriptions will be made below on how the abnormality reason is diagnosed out in time when the abnormality occurs with an example. Taking the abnormality as failure to send a DHCP Request packet for example, when the network management device receives information reported by the first AP that the DHCP Request packet is sent unsuccessfully, an egress flow bandwidth between the first AP and the DHCP server is detected. If it is detected that the egress flow bandwidth is far less than a set bandwidth threshold, it is analyzed that the reason of unsuccessfully sending the DHCP Request packet is insufficient network bandwidth. Taking the abnormality as unsuccessfully receiving the DHCP ACK packet returned by the DHCP server for example, when the network management device receives information reported by the first AP that the DHCP ACK packet returned by the DHCP server is unsuccessfully received, packet processing of the DHCP server may be detected to determine a load of the DHCP server. If the number of the DHCP Request packets processed by the DHCP server concurrently is far higher a set concurrent number, it is analyzed that the reason of unsuccessfully receiving the DHCP ACK packet returned by the DHCP server is excessive load pressure of the DHCP server.

At block 302, the first AP requests authentication by simulating a client refers to that the first AP requests an authentication server to perform authentication for the client simulated by the present AP. The authentication herein may be a common authentication such as an MAC authentication, a Portal authentication, and a 802.1x authentication, which is not limited herein.

It is noted that, in the present disclosure, to guarantee the network management device can fully obtain the entire process of performing authentication for the client simulated by the first AP, the first AP, in an example, further needs to report authentication process information of performing authentication for the client simulated by the first AP and an authentication result to the network management device.

In an example, the authentication process information refers to process information that the authentication server performs authentication for a client simulated by the first AP. The process information is similar to the association process information and the IP address obtaining process information as above, which will not be repeated herein.

In an example, the authentication result includes information that whether authentication is successful.

Herein, by reporting the authentication process information of performing authentication for a client simulated by the first AP and the authentication result to the network management device, it can be guaranteed that the network management device fully detects the entire process of performing authentication for a client simulated by the first AP and also diagnoses out an abnormality reason in time when the abnormality occurs.

At block 303, the first AP connects with a network by simulating a client to test WLAN service quality provided by the second AP.

In an example, how the first AP connects with the network by simulating the client to test the WLAN service quality provided by the second AP at block 303 is described with an example in the flowchart of FIG. 4 below, which is not described herein.

In an example, the first AP further needs to report the test result of testing the WLAN service quality provided by the second AP to the network management device by the means of simulating a client. After receiving the test result, the network management device may analyze out the WLAN service quality provided by the second AP based on the test result, and may also send a warning or feed an abnormality reason back to a staff in time in the case that WLAN service provided by the second AP is abnormal, so that the staff can solve the abnormality based on the abnormality reason, thereby achieving real-time network tracking.

Thus, the flow of FIG. 3 is completed. Through the flow of FIG. 3, it is realized that the first AP really tests the WLAN service quality provided by the second AP by simulating a client.

Figure 4:
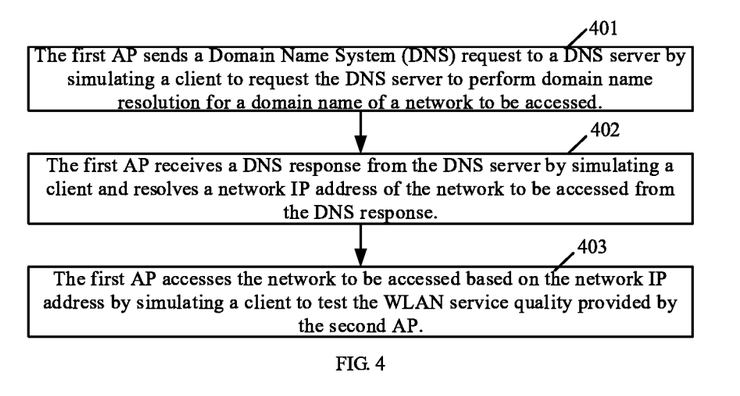
FIG. 4 is a flowchart illustrating an implementation of block 303 according to an example of the present disclosure.

FIG. 4 is a flowchart illustrating implementation of block 303 according to an example of the present disclosure. As shown in FIG. 4, the flow may include the following blocks.

At block 401, the first AP sends a Domain Name System (DNS) request to a DNS server by simulating a client to request the DNS server to perform domain name resolution for a domain name of a network to be accessed.

Block 401 is performed when a client simulated by the first AP is authenticated successfully. When the client simulated by the first AP is authenticated successfully, it indicates that the first AP can start normal internet-surfing behaviors by simulating a client. When normal internet-surfing behaviors are started, it is desired to request domain name resolution for the network to be accessed. Block 401 is a process of requesting domain name resolution. The domain name resolution can be performed based on a process similar to an existing domain name resolution process after the DNS server receives the DNS request. Thus, the specific domain name resolution process will not be repeated herein.

In an example, the network to be accessed herein may be a pre-designated network for a network test.

In another example, the network to be accessed herein may be a network that is accessed randomly as needed, which is not limited herein.

At block 402, the first AP receives a DNS response from the DNS server by simulating a client and resolves a network IP address of the network to be accessed from the DNS response.

In an example, if the DNS response includes an network IP address, the network IP address carried in the DNS response generally is the IP address of the network to be accessed resolved based on a DNS request. This means the domain name resolution is successful, and otherwise the domain name resolution is unsuccessful.

At block 403, the first AP accesses the network to be accessed based on the network IP address by simulating a client to test the WLAN service quality provided by the second AP.

In an example, the WLAN service quality provided by the second AP is represented by a network speed. When the network speed of the WLAN provided by the second AP is higher or equal to a set network speed, it indicates that the WLAN service quality provided by the second AP is good, and otherwise, it indicates that the WLAN service quality provided by the second AP is bad. Finally, test of the WLAN service quality provided by the second AP is achieved.

It is noted that, in the present disclosure, to guarantee that the network management device can fully obtain the entire process that the first AP requests domain name resolution by simulating the client, the first AP, in an example, may further need to report a domain name resolution result received by the first AP by simulating the client to the network management device. The domain name resolution result herein refers to a result that is related to performing domain name resolution for a domain name of a network to be accessed by the DNS server and determined by the first AP based on the DNS response. In an example, if the first AP receives the DNS response carrying a network IP address after sending a DNS request to the DNS server, it indicates that the DNS resolution is successful. In this case, the domain name resolution result refers to successful domain name resolution and otherwise the domain name resolution result refers to unsuccessful domain name resolution.

Thus, the flow of FIG. 4 is completed.

It is noted that, in the present disclosure, the first AP may further need to detect channel quality of the working channel of the second AP based on the obtained working channel information of the second AP, and report a channel quality detection result to the network management device. In an example, the channel quality detection result may include but not limited to network signal intensity, channel utilization rate, signal interference and so on. After the first AP reports the channel quality detection result to the network management device, the network management device may determine whether the WLAN service provided by the second AP is normal according to the channel quality detection result reported by the first AP. Specifically, there are many implementations for the network management device to determine whether the WLAN service provided by the second AP is normal according to the channel quality detection result reported by the first AP. One implementation hereof will be described below as an example.

In an example, the network management device determines whether the WLAN service provided by the second AP is normal according to the channel quality detection result reported by the first AP and a machine learning algorithm. FIG. 2 is taken as an example: if the working channel of the second AP is a channel 1, the network management device may receive a channel quality detection result (with a current signal intensity as an example) of the channel 1 reported by the first AP as a21, and determine whether the signal intensity of the channel 1 fluctuates based on the received current signal intensity of the channel 1. If yes, it is determined that the WLAN service provided by the second AP is abnormal and if no, it is determined that the WLAN service provided by the second AP is normal. Herein, the network management device determines whether the signal intensity of the channel 1 fluctuates based on the received current signal intensity of the channel 1, which can be exemplified as follows: whether the received current signal intensity of the channel 1 exceeds an existing channel intensity interval of the channel 1 is determined; if yes, it is determined that the signal intensity of the channel 1 fluctuates, if no, it is determined that the signal intensity of the channel 1 does not fluctuate. For example, the current signal intensity of the channel 1 is −70, which exceeds the channel intensity interval (obtained by accumulating signal intensities of the channel 1 in a period) of the channel 1, it is determined that the signal intensity of the channel 1 fluctuates.

In an example, when determining that the WLAN service provided by the second AP is abnormal, the network management device may send a warning or perform feedback to a designated target such as a staff of a fixed location (e.g. a hotel) to recover the network as soon as possible.

As can be seen from the flows shown in FIG. 3 and FIG. 4, the first AP reports the process information of different operations by simulating the client and the results (collectively referred to as network information) to the network management device. As mentioned above, the network information of simulating the client by the first AP mainly includes: the association process information of associating with the second AP by simulating the client and the association result; the IP address request process information of requesting the IP address by simulating the client and the IP address request result; the authentication process information of performing authentication for the client simulated by the first AP and the authentication result; and the result that is related to performing domain name resolution for a domain name of the network to be accessed by the DNS server and determined by the first AP based on the DNS response from the DNS server.

After receiving the network information reported by the first AP, the network management device may diagnose whether the network is abnormal based on the network information and may send a warning or perform feedback to a designated target such as a staff of a fixed location (e.g. a hotel) when diagnosing out a network abnormality. It is noted that, in the present disclosure, the network management device may easily determine an abnormality reason according to the process information of different operations performed by the first AP by simulating the client and the results (collectively referred to as network information) when diagnosing out a network abnormality. In this case, when feeding back the abnormality to the designated target such as a staff of a fixed location (e.g. a hotel), the network management device may provide the abnormality reason so that the designated target such as the staff of a fixed location (e.g. a hotel) can replace a device in time to recover network access. In this way, device replacement can be achieved in real time and any inexperienced staff can also solve an abnormality.

As can be seen from the flow of FIG. 3, in the present disclosure, the first AP simulates the client to test the WLAN service quality provided by the second AP, and then report the test result to the network management device. The network management device may receive the test result of the WLAN service quality tested by the first AP by simulating a client, and diagnose the WLAN service provided by the second AP based on the received test result.

Further, when a plurality of APs running in the WLAN Doctor mode like the first AP all work in a manner as the first AP, the network management device may receive test results reported by the plurality of APs running in the WLAN Doctor mode like the first AP. In this way, the network management device may optimize the WLAN based on the received test results. Specifically, the network management device may analyze the test results reported by different APs through big data technology to analyze the network experience of the entire WLAN and then optimize the entire WLAN based on the analysis result.

A method of the present disclosure will be described below with a specific example.

Figure 5:
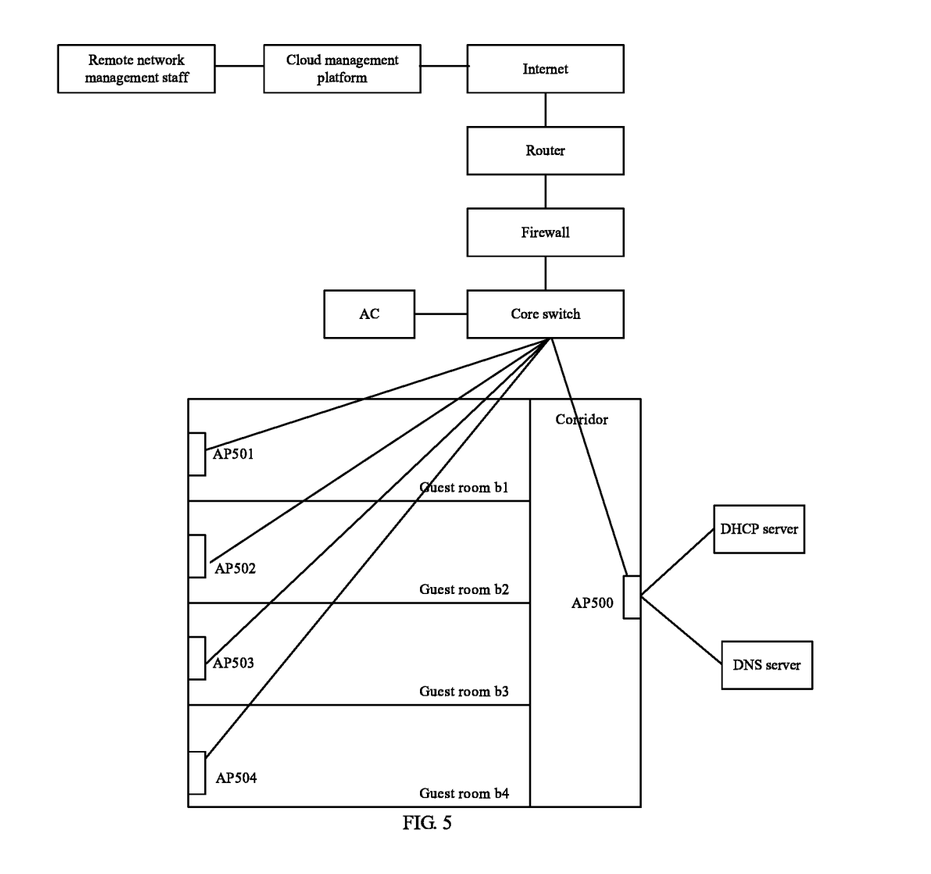
FIG. 5 is a schematic diagram illustrating networking according to an example of the present disclosure.

FIG. 5 is a schematic diagram illustrating networking according to an example of the present disclosure. In FIG. 5, the network management device is illustrated with a cloud management platform as an example.

In FIG. 5, the method is applied to a hotel as an example. As shown in FIG. 5, it is determined that an AP500 which is located in a corridor of the hotel and runs currently in a WLAN service mode needs to switch to a WLAN Doctor mode according to requirements.

The cloud management platform sends a mode switching instruction to the AP500, where the mode switching instruction is used to instruct the AP500 to switch from the running WLAN service mode to the WLAN Doctor mode.

An AC located between the cloud management platform and the AP500 may receive the mode switching instruction from the cloud management platform earlier than the AP500 and then forward the received mode switching instruction to the AP500.

After receiving the mode switching instruction, the AP500 switches from the running WLAN service mode to the WLAN Doctor mode. At this time, the AP500 runs in the WLAN Doctor mode. It is noted that, in another example, one AP dedicated to the WLAN Doctor mode may be deployed separately. Once the AP dedicated to the WLAN Doctor mode is deployed, the AP may run in the WLAN Doctor mode. Descriptions are made only with the AP500 as an example.

After switching from the running WLAN service mode to the WLAN Doctor mode, the AP500 may return a message of successful mode switching to the cloud management platform. The AC located between the cloud management platform and the AP500 may receive the message of successful mode switching from the AP500 earlier than the cloud management platform and then forward the received message of successful mode switching to the cloud management platform. After receiving the message of successful mode switching from the AP500, the cloud management platform may send a network diagnosis instruction to the AP500. The network diagnosis instruction carries working channel information of at least one AP located in a diagnosis region of the AP500. Herein, the network diagnosis instruction carries the working channel information of an AP501 to an AP504.

The AC located between the cloud management platform and the AP500 receives the network diagnosis instruction from the cloud management platform earlier than the AP500, and then forward the network diagnosis instruction to the AP500.

After receiving the network diagnosis instruction from the cloud management platform, the AP500 obtains the working channel information of the AP501 to the AP504 located in the diagnosis region of the AP500 from the received network diagnosis instruction.

The working channel information of the AP501 is obtained as an example.

The AP500 may detect the channel quality (for example, signal intensity, channel utilization rate, and signal interference and so on) of the working channel (denoted as channel 1) of the AP501 based on the working channel information of the AP501, and report the channel quality detection result to the could management platform. The cloud management platform receives the channel quality detection result of the channel 1 and determines whether the WLAN service provided by the AP501 is normal according to the channel quality detection result and a machine learning algorithm (determined as above). In an example, the cloud management platform may send a warning when determining that the WLAN service provided by the AP501 is abnormal.

The AP500 simulates a behavior of a client, associates with the AP501 based on the working channel information of the AP501 and reports association process information and an association result to the cloud management platform.

After being successfully associated with the AP501, the AP500 requests an IP address and an authentication by simulating the behavior of a client. The AP500 may report IP address request process information of requesting an IP address by simulating a client and an IP address request result to the cloud management platform. Also, the AP500 may report the authentication process information of performing authentication for the client simulated by the AP500 and the authentication result to the cloud management platform.

After obtaining the IP address successfully and performing authentication successfully, the AP500 may start normal internet-surfing behaviors. At this time, a DNS request may be sent to the DNS server to request the DNS server to perform domain name resolution for the domain name of the network to be accessed.

The AP500 receives a DNS response returned by the DNS server by simulating a client and solves a network IP address of the network to be accessed from the DNS response. In an example, the AP500 may further need to report a domain name resolution result received by simulating a client to the cloud management platform. The domain name resolution result herein refers to a result that is related to performing domain name resolution for a domain name of the network to be accessed by the DNS server and determined by the AP500 based on the DNS response from the DNS server. In an example, After the AP500 sends a DNS request to the DNS server by simulating a client, if the received DNS response carries a network IP address, it indicates the DNS resolution is successful. In this case, the domain name resolution result refers to successful domain name resolution and otherwise refers to unsuccessful domain name resolution.

After successful domain name resolution, the AP500 may access the network to be accessed according to the network IP address carried in the DNS response to test the WLAN service quality provided by the AP501. The AP500 reports the test result to the cloud management platform and the cloud management platform may diagnose the real network condition of the AP501 based on the test result and send a warning or feed back an abnormality reason to staff when detecting a network abnormality so that the staff can replace a device based on the abnormality reason, thereby quickly solving network abnormality and achieving 24-hour real-time network tracking.

With the AP501 as an example, the above descriptions are made on how the AP500 tests the WLAN service quality provided by the AP501. Similarly, the AP500 may also test the WLAN service quality provided by the AP502 to the AP504 based on the above principle.

After the AP500 reports the test results of the WLAN service quality provided by the AP501 to the AP504 to the cloud management platform, the cloud management platform may perform big data analysis based on the reported test results to analyze the network experience of the entire WLAN, that is, to optimize the entire WLAN based on an analysis result.

The above analysis is made to the examples of the present disclosure. Descriptions will be made below to an apparatus provided by an example of the present disclosure.

Figure 6:
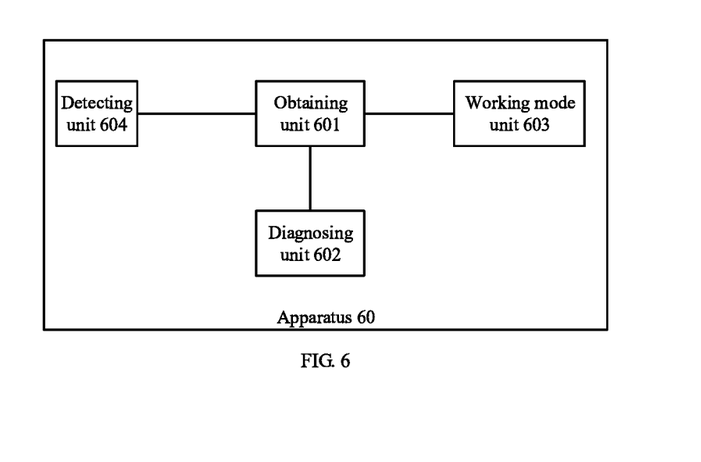
FIG. 6 is a schematic diagram illustrating a structure of an apparatus for diagnosing a network according to an example of the present disclosure.

FIG. 6 is a schematic diagram illustrating a structure of an apparatus for diagnosing a network according to an example of the present disclosure. The apparatus 60 may be applied to a first Access Point (AP) running in a Wireless Local Area Network (WLAN) Doctor mode. The apparatus 60 may include: an obtaining unit 601 and a diagnosing unit 602. The obtaining unit 601 is configured to obtain working channel information of a second AP located in a diagnosis region of the first AP, wherein a WLAN service mode in which the second AP runs is different from the WLAN Doctor mode. The diagnosing unit 602 is configured to test the WLAN service quality provided by the second AP by simulating a client according to the working channel information of the second AP obtained by the obtaining unit.

As shown in FIG. 6, the apparatus 60 may further include a working mode unit 603 and a detecting unit 604. The working mode unit 603 is configured to receive a mode switching instruction and control the first AP to switch from the running WLAN service mode to the WLAN Doctor mode according to the mode switching instruction. The detecting unit 604 is configured to detect the channel quality of the working channel of the second AP according to the working channel information of the second AP obtained by the obtaining unit 601 and report a channel quality detection result to a network management device.

In an example, the obtaining unit 601 is specifically configured to receive a network diagnosis instruction and obtain the working channel information of the second AP from the network diagnosis instruction.

In an example, the diagnosing unit 602 is specifically configured to control the first AP to be associated with the second AP by simulating a client based on the working channel information of the second AP, control the first AP to request an IP address and an authentication by simulating a client after the first AP is successfully associated with the second AP, and control the first AP to connect with the network by simulating a client to test the WLAN service quality provided by the second AP after obtaining the IP address successfully and performing authentication successfully.

In an example, the diagnosing unit 602 controls the first AP to connect with a network by simulating a client to test the WLAN service quality provided by the second AP, specifically including: controlling the first AP to send a Domain Name System (DNS) request to a DNS server by simulating a client to request the DNS server to perform domain name resolution for a domain name of a network to be accessed; controlling the first AP to receive a DNS response returned by the DNS server by simulating a client and solve a network IP address of the network to be accessed from the DNS response; and controlling the first AP to access the network to be accessed by simulating a client according to the network IP address to test the WLAN service quality provided by the second AP.

In an example, the diagnosing unit 602 is further configured to: report association process information that the first AP is associated with the second AP and an association result to the network management device; and/or, report IP address request process information that the first AP requests an IP address and an IP address request result to the network management device; and/or, report authentication process information of performing authentication for the first AP and an authentication result to the network management device; and/or, report a domain name resolution result to the network management device, where the domain name resolution result refers to a result that is related to performing domain name resolution for a domain name of a network to be accessed by the DNS server and determined by the first AP based on the DNS response from the DNS server; and/or, report a test result of the WLAN service quality provided by the second AP to the network management device.

Thus, the structural diagram of the apparatus of FIG. 6 is completed.

Figure 7:
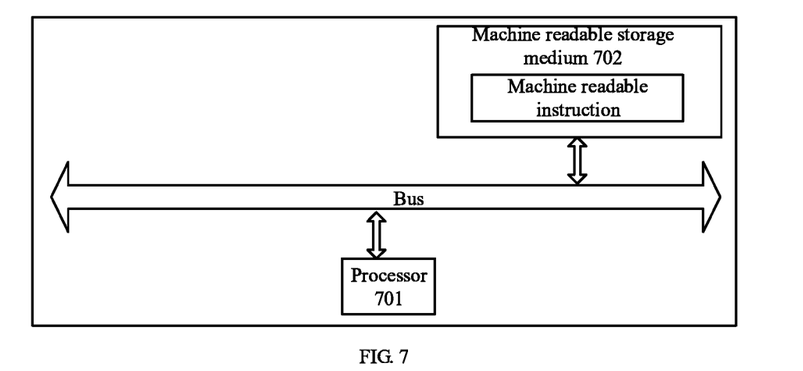
FIG. 7 is a schematic diagram illustrating a hardware structure of the apparatus of FIG. 6 according to an example of the present disclosure.

FIG. 7 is a schematic diagram illustrating a hardware structure of the apparatus of FIG. 6 according to an example of the present disclosure. As shown in FIG. 7, the hardware structure includes a processor 701, and a machine readable storage medium 702 storing machine executable instructions.

The processor 701 and the machine readable storage medium 702 may communicate via a system bus. Also, by reading and executing the machine executable instructions corresponding to a network diagnosis logic and stored on the machine readable storage medium 702, the processor 701 may perform a method of diagnosing a network as above. In an example, the processor 701 is configured to: obtain working channel information of a second AP located in a diagnosis region of the first AP, wherein a WLAN service mode in which the second AP runs is different from the WLAN Doctor mode; and test a WLAN service quality provided by the second AP by simulating a client according to the working channel information of the second AP obtained by the obtaining unit.

The machine readable storage medium 702 mentioned herein may be any of electronic, magnetic, optical or other physical storage devices and may contain or store information such as executable instructions, data and so on. For example, the machine readable storage medium 702 may be a Random Access Memory (RAM), a volatile memory, a non-volatile memory, a flash memory, a storage drive (e.g. hard disk drive), a solid state hard disk, any type of storage disk (e.g., compact disk, Digital Video Disk (DVD)), or a similar storage medium, or a combination thereof.

Thus, the hardware structure of FIG. 7 is completed.

In the present disclosure, there is also provided a machine readable storage medium including machine executable instructions, for example, the machine readable storage medium 702 in FIG. 7. The machine executable instructions may be executed by a processor in an apparatus for diagnosing a network to perform the above method of diagnosing a network.

The foregoing disclosure is merely illustrative of some examples of the present disclosure but not intended to limit the present disclosure, and any modifications, equivalent substitutions, adaptations thereof made within the spirit and principles of the disclosure shall be encompassed in the scope of protection of the present disclosure.

The invention claimed is:

1. A method of diagnosing a network, comprising:
   obtaining, by a first Access Point (AP) running in Wireless Local Area Network (WLAN) Doctor mode, working channel information of a second AP located in a diagnosis region of the first AP, where a WLAN service mode in which the second AP runs is different from the WLAN Doctor mode; and
   testing, by the first AP, a WLAN service quality provided by the second AP by simulating a client based on the working channel information of the second AP,
   wherein the first AP testing the WLAN service quality provided by the second AP by simulating the client based on the working channel information of the second AP comprises:
   associating, by the first AP, with the second AP by simulating the client based on the working channel information of the second AP;
   requesting, by the first AP, an IP address and an authentication by simulating the client in response to the first AP being successfully associated with the second AP;
   connecting, by the first AP, with the network by simulating the client to test the WLAN service quality provided by the second AP, upon obtaining the IP address and performing authentication successfully;
   when a network management device receives information reported by the first AP in which an association probe request is unsuccessfully sent, an upstream egress flow bandwidth of the second AP is detected; and
   if it is detected that the upstream egress flow bandwidth is less than a desired bandwidth threshold by a predetermined amount, it is determined that a reason for unsuccessfully sending the association probe request is insufficient network bandwidth.

2. The method according to claim 1, further comprising:
before obtaining, by the first AP running in the WLAN Doctor mode, the working channel information of the second AP located in the diagnosis region of the first AP,
receiving, by the first AP, a mode switching instruction; and
switching, by the first AP, from the running WLAN service mode to the WLAN Doctor mode according to the mode switching instruction.

3. The method according to claim 1, wherein the first AP obtaining the working channel information of the second AP located in the diagnosis region of the first AP, comprises:
receiving, by the first AP, the network diagnosis instruction; and
obtaining, by the first AP, the working channel information of the second AP from the network diagnosis instruction.

4. The method according to claim 1, further comprising:
after obtaining, by the first AP, the working channel information of the second AP located in the diagnosis region of the first AP,
detecting, by the first AP, channel quality of the working channel of the second AP based on the working channel information of the second AP; and
reporting, by the first AP, a channel quality detection result to a network management device.

5. The method according to claim 1, wherein the first AP connecting with the network by simulating the client to test the WLAN service quality provided by the second AP comprises: sending, the first AP, a Domain Name System (DNS) request to a DNS server by simulating the client to request the DNS server to perform domain name resolution for a domain name of a network to be accessed; receiving, by the first AP, a DNS response returned by the DNS server by simulating the client, and solving a network IP address of the network to be accessed from the DNS response; and accessing, by the first AP, the network to be accessed by simulating the client based on the network IP address to test the WLAN service quality provided by the second AP.

6. The method according to claim 5, further comprising:
reporting, by the first AP, network information to a network management device, wherein the network information comprises at least one of:
association process information that the first AP is associated with the second AP and an association result;
IP address request process information that the first AP requests an IP address and an IP address request result;
authentication process information of performing authentication for the first AP and an authentication result; or
a domain name resolution result which derives from performing domain name resolution for a domain name of a network to be accessed by the DNS server and determined by the first AP based on the DNS response from the DNS server.

7. The method according to claim 1, further comprising:
reporting, by the first AP, a test result of the WLAN service quality provided by the second AP to a network management device.

8. A non-transitory machine readable storage medium storing thereon instructions that are executable by a processor to perform operations comprising:
obtaining working channel information of a second AP located in a diagnosis region of the first AP, where a WLAN service mode in which the second AP runs is different from the WLAN Doctor mode; and
testing a WLAN service quality provided by the second AP by simulating a client based on the working channel information of the second AP,
wherein the testing of the WLAN service quality provided by the second AP by simulating the client based on the working channel information of the second AP comprises:
associating, by the first AP, with the second AP by simulating the client based on the working channel information of the second AP;
requesting, by the first AP, an IP address and an authentication by simulating the client in response to the first AP being successfully associated with the second AP;
connecting, by the first AP, with the network by simulating the client to test the WLAN service quality provided by the second AP, upon obtaining the IP address and performing authentication successfully;
when a network management device receives information reported by the first AP in which an association probe request is unsuccessfully sent, an upstream egress flow bandwidth of the second AP is detected; and
if it is detected that the upstream egress flow bandwidth is less than a desired bandwidth threshold by a predetermined amount, it is determined that a reason for unsuccessfully sending the association probe request is insufficient network bandwidth.

9. An apparatus for diagnosing a network, the apparatus being applied to a first Access Point (AP) running in a Wireless Local Area Network (WLAN) Doctor mode and comprising:
a processor; and
a memory for storing instructions that are executable by the processor to perform operations comprising:
obtaining working channel information of a second AP located in a diagnosis region of the first AP, where a WLAN service mode in which the second AP runs is different from the WLAN Doctor mode; and
testing a WLAN service quality provided by the second AP by simulating a client based on the working channel information of the second AP,
wherein the testing of the WLAN service quality provided by the second AP by simulating the client based on the working channel information of the second AP comprises:
associating with the second AP by simulating the client based on the working channel information of the second AP;
requesting an IP address and an authentication by simulating the client in response to the first AP being successfully associated with the second AP;
connecting with the network by simulating the client to test the WLAN service quality provided by the second AP, upon obtaining the IP address and performing authentication successfully;
when a network management device receives information reported by the first AP in which an association probe request is unsuccessfully sent, an upstream egress flow bandwidth of the second AP is detected; and
if it is detected that the upstream egress flow bandwidth is less than a desired bandwidth threshold by a predetermined amount, it is determined that a reason for unsuccessfully sending the association probe request is insufficient network bandwidth.

10. The apparatus according to claim 9, wherein the operations further comprise:

before obtaining the working channel information of the second AP located in the diagnosis region of the first AP,
receiving a mode switching instruction; and
switching from the running WLAN service mode to the WLAN Doctor mode according to the mode switching instruction.

11. The apparatus according to claim 9, wherein the obtaining of the working channel information of the second AP located in the diagnosis region of the first AP comprises:
receiving the network diagnosis instruction; and
obtaining the working channel information of the second AP from the network diagnosis instruction.

12. The apparatus according to claim 9, wherein the operations further comprise:
after obtaining the working channel information of the second AP located in the diagnosis region of the first AP,
detecting channel quality of the working channel of the second AP based on the working channel information of the second AP; and
reporting a channel quality detection result to a network management device.

13. The apparatus according to claim 9, the connecting with the network by simulating the client to test the WLAN service quality provided by the second AP comprises: sending a Domain Name System (DNS) request to a DNS server by simulating the client to request the DNS server to perform domain name resolution for a domain name of a network to be accessed; receiving a DNS response returned by the DNS server by simulating the client, and solving a network IP address of the network to be accessed from the DNS response; and accessing the network to be accessed by simulating the client based on the network IP address to test the WLAN service quality provided by the second AP.

14. The apparatus according to claim 9, wherein the operations further comprise:
reporting network information to a network management device, wherein the network information comprises at least one of:
association process information that the first AP is associated with the second AP and an association result;
IP address request process information that the first AP requests an IP address and an IP address request result;
authentication process information of performing authentication for the first AP and an authentication result; or
a domain name resolution result which derives from performing domain name resolution for a domain name of a network to be accessed by the DNS server and determined by the first AP based on the DNS response from the DNS server.

15. The apparatus according to claim 9, wherein the operations further comprise:
reporting a test result of the WLAN service quality provided by the second AP to a network management device.

* * * * *